US007664533B2

(12) United States Patent
Logothetis et al.

(10) Patent No.: US 7,664,533 B2
(45) Date of Patent: Feb. 16, 2010

(54) METHOD AND APPARATUS FOR A MULTI-BEAM ANTENNA SYSTEM

(75) Inventors: Andrew Logothetis, Uppsala (SE); David Astely, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 498 days.

(21) Appl. No.: 10/704,158

(22) Filed: Nov. 10, 2003

(65) Prior Publication Data

US 2005/0101352 A1 May 12, 2005

(51) Int. Cl.
*H04M 1/00* (2006.01)

(52) U.S. Cl. .................. 455/562.1; 455/276.1; 342/81; 342/368

(58) Field of Classification Search ................. 455/561, 455/562.1, 101, 134, 135, 137, 276.1, 226.3, 455/63.1, 67.11, 25.63, 63.4, 67.16, 91; 375/144, 375/147, 148; 342/372, 378, 81, 82, 350, 342/354, 367, 368; 343/751, 757
See application file for complete search history.

(56) References Cited

U.S. PATENT DOCUMENTS

| | | | | |
|---|---|---|---|---|
| 6,218,987 | B1 | 4/2001 | Derneryd et al. | |
| 6,549,164 | B2 * | 4/2003 | Paschen et al. | 342/371 |
| 6,999,794 | B1 * | 2/2006 | Lindskog et al. | 455/562.1 |
| 7,069,050 | B2 * | 6/2006 | Yoshida | 455/562.1 |
| 7,155,231 | B2 * | 12/2006 | Burke et al. | 455/450 |

(Continued)

FOREIGN PATENT DOCUMENTS

| | | |
|---|---|---|
| EP | 0 639 035 | 2/1995 |

(Continued)

OTHER PUBLICATIONS

International Search Report and Written Opinion mailed Feb. 16, 2005 in corresponding PCT Application PCT/SE2004/001551.

(Continued)

*Primary Examiner*—Patrick N Edouard
*Assistant Examiner*—Anthony S Addy
(74) *Attorney, Agent, or Firm*—Nixon & Vanderhye P.C.

(57) ABSTRACT

An antenna array in a radio node includes multiple antenna elements for transmitting a wider beam covering a majority of a sector cell that includes a common signal and a narrower beam covering only a part of the sector cell that includes a mobile user-specific signal. Transmitting circuitry is coupled to the antenna array, and processing circuitry is coupled to the transmitting circuitry. The processing circuitry ensures the user-specific signal and the common signal in a mixed beam embodiment are in-phase and time-aligned at the antenna array. In a steered beam embodiment, the processing circuitry ensures the user-specific signal and the common signal are time-aligned and have a controlled phase difference when received at mobile stations in the sector cell. In both embodiments, distortions in the common signal and the user-specific signal associated with their conversion from baseband frequency to radio frequency are also compensated. And in the steered beam embodiment, beam forming weights are used not only to radiate a narrower beam to the desired mobile user but also to direct a wider common signal beam to reach all mobile users in the cell.

58 Claims, 13 Drawing Sheets

U.S. PATENT DOCUMENTS

| | | | | |
|---|---|---|---|---|
| 7,221,699 | B1 * | 5/2007 | Lindskog | 375/147 |
| 7,263,082 | B1 * | 8/2007 | Lindskog | 370/335 |
| 2002/0150065 | A1 * | 10/2002 | Ponnekanti | 370/334 |
| 2003/0198201 | A1 * | 10/2003 | Ylitalo et al. | 370/329 |
| 2004/0014433 | A1 * | 1/2004 | Hamada et al. | 455/101 |
| 2005/0014474 | A1 * | 1/2005 | Jitsukawa et al. | 455/101 |

FOREIGN PATENT DOCUMENTS

| | | |
|---|---|---|
| EP | 1175022 | 1/2002 |
| EP | 1229669 | 8/2002 |
| WO | 0169814 | 9/2001 |

OTHER PUBLICATIONS

Adaptive Antennas for GSM and TDMA Systems, IEEE Personal Communications, Jun. 1999, Anderson et al, pp. 74-86.

Adaptive Antennas in WCDMA Systems-Link Level Simulation Results Based on Typical User Scenarios, Bo Goransson et al., pp. 157-164.

Nortel Networks CDMA Advantages of AABA Smart Antenna Technology, The CDG Technology Forum, Oct. 1, 2002, Martinez-Munoz et al.

Translation of Chinese official action, Mar. 6, 2009, in corresponding Chinese Application No. 200480032946.0.

* cited by examiner

METHOD AND APPARATUS FOR A MULTI-BEAM ANTENNA SYSTEM

BACKGROUND

The invention relates generally to wireless communication nodes, and more particularly, to wireless communications nodes that utilize a multi-beam antenna system.

Adaptive antenna arrays have been used successfully in various cellular communications systems, e.g., the GSM system. An adaptive antenna array replaces a conventional sector antenna by two or more closely-spaced antenna elements. The antenna array directs a narrow-beam of radiated energy to a specific mobile user to minimize the interference to other users. Adaptive antenna arrays have been shown in GSM and TDMA systems to substantially improve performance, measured in increased system capacity and/or increased range, compared to an ordinary sector covering antenna.

Adaptive antenna systems may be grouped into two categories: fixed-beam systems, where radiated energies are directed to a number of fixed directions, and steered-beam systems, where the radiated energy is directed towards any desired location. Both types of narrow beam systems are generally illustrated in FIG. 2, which also shows a sector beam that covers the sector cell. The benefits of adaptive antenna systems include: efficient-utilization of spectral resources by exploiting the spatial (angular) separation of users, cost efficiency, increased range or capacity, and easy integration, i.e., no mobile terminal changes are required as would be in other schemes such as Multiple Input Multiple Output (MIMO) schemes which employ multiple antennas at both the terminal and the base stations.

Fixed beams can be generated in baseband frequency or in Radio Frequency (RF). Baseband generation requires a calibration unit that estimates and compensates for any signal distortion present in the signal path from baseband via the Intermediate Frequencies (IF) and the RF up to each antenna element in the array. The RF method generates the fixed-beams using, for example, a Butler matrix at radio frequency.

Under some assumptions, for example a uniform linear array where the antenna elements are separated by a half wavelength, there is a one-to-one correspondence between a certain direction-of-arrival (DOA) of an incoming wave front and the phase shift of the signals at the output of the antenna elements. By appropriately phase shifting the signals prior to transmission (or reception), an adaptive antenna system can steer the radiated energy towards (or from) the desired mobile user, while at the same time, minimize the interference to other mobile users. Steered-beams require calibration to estimate and compensate for any signal distortion present in the signal path from baseband to the antenna elements and vice-versa.

Time-varying, multipath fading seriously degrades the quality of the received signals in many wireless communication environments. One way to mitigate deep fade effects and provide reliable communications is to introduce redundancy (diversity) in the transmitted signals. The added redundancy may be in the temporal or the spatial domain. Temporal (time) diversity is implemented using channel coding and interleaving. Spatial (space) diversity is achieved by transmitting the signals on spatially-separated antennas or using differently polarized antennas. Such strategies ensure independent fading on each antenna. Spatial transmit diversity can be subdivided into closed-loop or open-loop transmit diversity modes, depending on whether feedback information is transmitted from the receiver back to the transmitter.

In adaptive antenna systems, user-specific data signals are transmitted using narrower beams (whether fixed or steerable). But system-specific or common signals are generally transmitted via another antenna that has a wider covering beam, e.g., a sector antenna. A typical common signal is the base station (primary) pilot signal. The pilot signal includes a known data sequence which every mobile radio uses to estimate the radio propagation channel. As the mobile moves, the radio propagation channel also changes. Because a good channel estimate is essential in order to detect the user-specific data, the pilot signal is used as a "phase reference." A beam-specific secondary pilot signal may be present on each beam and may also be used as a phase reference. Mobile users whose signals are transmitted with the same beam then use the same secondary pilot signal. Alternatively, mobile-dedicated pilot signals may be transmitted with the same beam as the user-specific signal and be used as a phase reference. The mobile user is instructed by the network which phase reference should be used.

There are several drawbacks of current multi-beam architectures. A first drawback is cost. A fixed-beam antenna array that forms the narrow beams at radio frequency may require an additional sector covering antenna to be implemented. The hardware complexity and cost are related to the: number of feeder cables equal to the number of beams+1 (for the sector-covering antenna), physical weight determined by the size of the antennas, and the height and size of the antenna mast. Different sector and narrow beam antennas add significantly to the cost of the base station.

A second drawback relates to phase reference mismatch and Quality of Service (QoS) degradation. The radio channel of the primary pilot signal transmitted by the sector covering antenna and the radio channel of the user-specific data transmitted through a narrow beam are not necessarily the same. If the mobile is instructed to use the primary pilot signal as a phase reference, then the mobile will expect that the user-specific data to be subject to the same radio channel as the primary pilot signal. But those channels are different. As a result, the phase reference is wrong, detection and decoding errors increase, and the Quality of Service (QoS) is degraded.

A third drawback is poor resource utilization. To compensate for the phase reference mismatch, the mobile can be instructed to use a beam-specific secondary pilot signal or a user-specific dedicated pilot signal as a phase reference. In the former case, all users within the same beam use the same pilot signal, whereas in the latter case, each user utilizes a unique pilot signal. The QoS is improved but at the expense of additional allocated resources, (e.g., power, codes, etc). Consequently, less power is available to other mobile users, adversely impacting system capacity and data throughput.

A further drawback concerns inflexibility and signaling delays. Suppose a mobile could receive a better signal from an alternative, secondary pilot per beam. The network must therefore periodically investigate which secondary pilot is most appropriate, i.e., received at maximum power. The antenna system and the mobile radio must be signaled by the network to report back several measurement reports. If the network determines that a new beam should be used to transmit the user-specific data, then the antenna system is instructed to change beams, and the mobile radio is signaled to start using the alternative secondary pilot channel as a phase reference. Such procedures cause delays and require significant signaling overhead.

Receiver diversity is widely used in today's wireless infrastructure and it offers substantial benefits in terms of uplink coverage and capacity. Further, transmit diversity can be use to improve the downlink performance and it may become a key feature in the $3^{rd}$ generation wireless systems. But transmit diversity signals are transmitted throughout the cell causing increased interference to other users, even though the intended mobile user is located in a certain direction. Nonetheless, combining transmit diversity with narrower, directed beams can offer significant benefits.

The above-identified drawbacks of current multi-beam architectures are overcome with an antenna system that includes an antenna array for transmitting a common signal in a wider beam covering a a sector cell and a mobile-user specific signal in a narrower beam covering only part of the sector cell. Transmitting circuitry is coupled to the antenna array and to filtering circuitry. In a first, "mixed beam" embodiment, the filtering circuitry filters the user-specific and common signals to compensate for distortions associated with their conversion from baseband frequency to radio frequency. The filtering circuitry and beam weighting circuitry ensure that the user-specific and common signals are substantially time-aligned and in-phase at the antenna array (preferably at a center antenna element). User-specific signal weights are designed to radiate a narrower beam (compared to the wide, sector-covering beam) in the direction of the mobile station such that each mobile can use the same common signal as a phase reference for channel estimation and demodulation.

In a second, "steered beam" embodiment, the filtering circuitry filters the user-specific and common signals to compensate for distortions associated with their conversion from baseband frequency to radio frequency. The filtering circuitry and beam weighting circuitry ensure that the user-specific and common signals are time-aligned and have a controlled phase difference when received at each mobile user in the cell. Each mobile user can use the common signal as a phase reference for channel estimation and demodulation. That phase difference is preferably controlled to obtain a good tradeoff between required transmit power, radiated interference, and quality of service to the users. Beam forming weights are used not only to radiate a narrower beam to the desired mobile user (as in the mixed beam embodiment) but also to direct wider common signal beam to reach all mobile users in the cell.

In an example, steered-beam implementation, the wide beam carrying the common signal is transmitted only from a center antenna element in the antenna array. Using the center antenna element to generate the wide common beam permits a correlation of the controlled phase difference between the common and user-specific signals received by the mobile user to be less than or equal to a target value that ensures a desired quality of service. Alternatively, the wide beam carrying the common signal may be generated using multiple antenna elements in the antenna array. Since the antenna elements are generally fixed in a predetermined "look direction" during the antenna array installation, all antenna elements can be utilized in conjunction with baseband signal processing to form a wide beam with desired characteristics, which could change with time depending on the cell planning. Beam forming weights applied to user-specific signal results in steering a narrower beam towards the mobile user from the antenna array. Providing such beam steering for both the user-specific signal beam and the common signal beam permits more intelligent aiming of both signal types in the cell.

In a more detailed, non-limiting example of the mixed beam embodiment, the antenna array includes N antenna elements, where N is an odd positive integer greater than one. A beam forming network is coupled between the antenna array and the transmitting circuitry. The beam forming network receives in each beam the user-specific and common signals and generates N signals which are provided to the antenna array. Before the beam forming network receives the N signals, each signal passes through beam-specific transmit filtering circuitry. The beam transmit filters cancel the common signal in all outputs of the beam forming network except at a center antenna element output. But the common signal is transmitted simultaneously on the N beams with equal or approximately equal power and phase.

Beam-weighting circuitry weights the user-specific signal with a beam weight corresponding to each beam and provides weighted, user-specific signals to the corresponding beam transmit filters. Each user-specific beam weight may be a function of the uplink average power received in the corresponding beam. An example function is the square root. The user-specific beam weights are selected to direct radiated energy in a relatively narrow beam from the antenna array to a desired mobile user.

Receiving circuitry is coupled to the beam forming network and to a signal processor. The signal processor combines signals received on the N beams to estimate a received signal and determines an average uplink power for each beam. Those average uplink powers are used to determine the user-specific beam weights. The mixed beam embodiment may be implemented in transmit diversity branches and/or in receive diversity branches.

In a more detailed example of the steered beam embodiment, the antenna array includes N antenna elements, where N is a positive integer—even or odd. The filtering circuitry includes N antenna transmit filters, and each antenna transmit filter is associated with a corresponding antenna element. The common signal and the user-specific signal may be transmitted simultaneously from all N antenna elements. The user-specific signal is transmitted with N user-specific beam weights, each user-specific beam weight corresponding to one of the N antenna elements. The beam weights are complex numbers used to phase-rotate and amplify the user-specific signal. The common signal is transmitted with N common signal beam weights, each common signal beam weight-corresponding to one of the N antenna elements. These beam weights may also be complex numbers used to phase-rotate and amplify the common signal. Alternatively, the common signal may be transmitted from only one antenna such as the central antenna element. In this case, the beam weights for the other antenna elements may be set to zero.

In the steered beam embodiment, the user-specific and common signal beam forming weights are determined (1) to yield high antenna gain so that the generated interference is reduced and (2) to keep the phase difference between the user-specific signal and the common signal at an acceptable level. The common signal is the phase reference signal for all mobiles in the cell, and the controlled phase difference between the common and user-specific signals can be viewed as random with its distribution being affected by statistics of the channel as well as the transmitter weights used.

In the receive side of the antenna system in the steered beam embodiment, a beam forming network, (which is not required in the steered beam embodiment on the transmit side), may be coupled to the N antenna elements for generating N received beams. Receiving circuitry is coupled to the beam forming network and to a signal processor. The signal processor processes signals received on the N received beams to estimate a received signal. The signal processor determines uplink channel statistics per user and predicts the corresponding downlink channel statistics. The steered beam embodiment may also be used in transmit and/or receive diversity branches.

The technology described in this application provides numerous advantages. First, common and user-specific signals can be transmitted without requiring a separate sector antenna. Second, neither secondary nor dedicated pilot signals are required as a phase reference. Third, the common and user-specific signals are transmitted without being distorted as a result of travel/processing from baseband outputs to the antenna elements. Fourth, the common and user-specific signals are received at the mobile terminals approximately in-phase (in the mixed beam case) or subject to some controlled random variations (in the steered beam case) and time-aligned, i.e., subject to approximately the same channel delay profile. Fifth, because the antenna array radiates the user-specific channels in a narrower beam directed to the desired mobile user, interference is suppressed to spatially-separated mobile users. Sixth, combining beam forming and transmit diversity or transmit/receive diversity offers significant benefits. A seventh advantage is transparency. Mobile users need not be aware of the architecture or the implementation of the antenna array. Eighth, backward compatibility permits ready system integration. No change to radio network controllers in the radio network is required. Ultimately, the invention may be used in any wireless system that can exploit downlink beamforming.

DETAILED DESCRIPTION

The following description, for purposes of explanation and not limitation, sets forth specific details to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer, using one or more application specific integrated circuits (ASICs), and/or using one or more digital signal processors (DSPs).

The invention relates to a multi-beam antenna system. A non-limiting example of a multi-beam antenna system is an adaptive array antenna, such as that shown in FIG. 1, which illustrates an example narrow antenna beam transmitted from the adaptive antenna encompassing a relatively narrow area in the sector cell where a desired mobile station is located. Because the side lobes are relatively low, there is less interference caused by the narrow beam to other mobiles and adjacent cells. Moreover, the intended mobile radio is more likely to receive the desired transmission at a higher signal-to-noise ratio using the directed narrow beam shown in FIG. 1.

Figure 1:
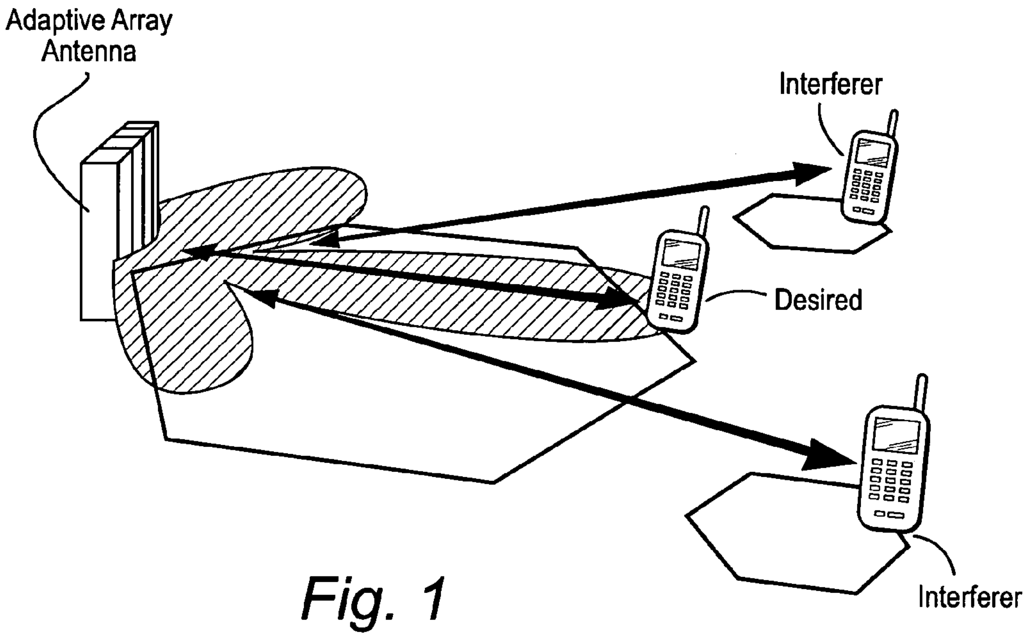
FIG. 1 illustrates an adaptive antenna system transmitting in a sector cell.
Figure 2:
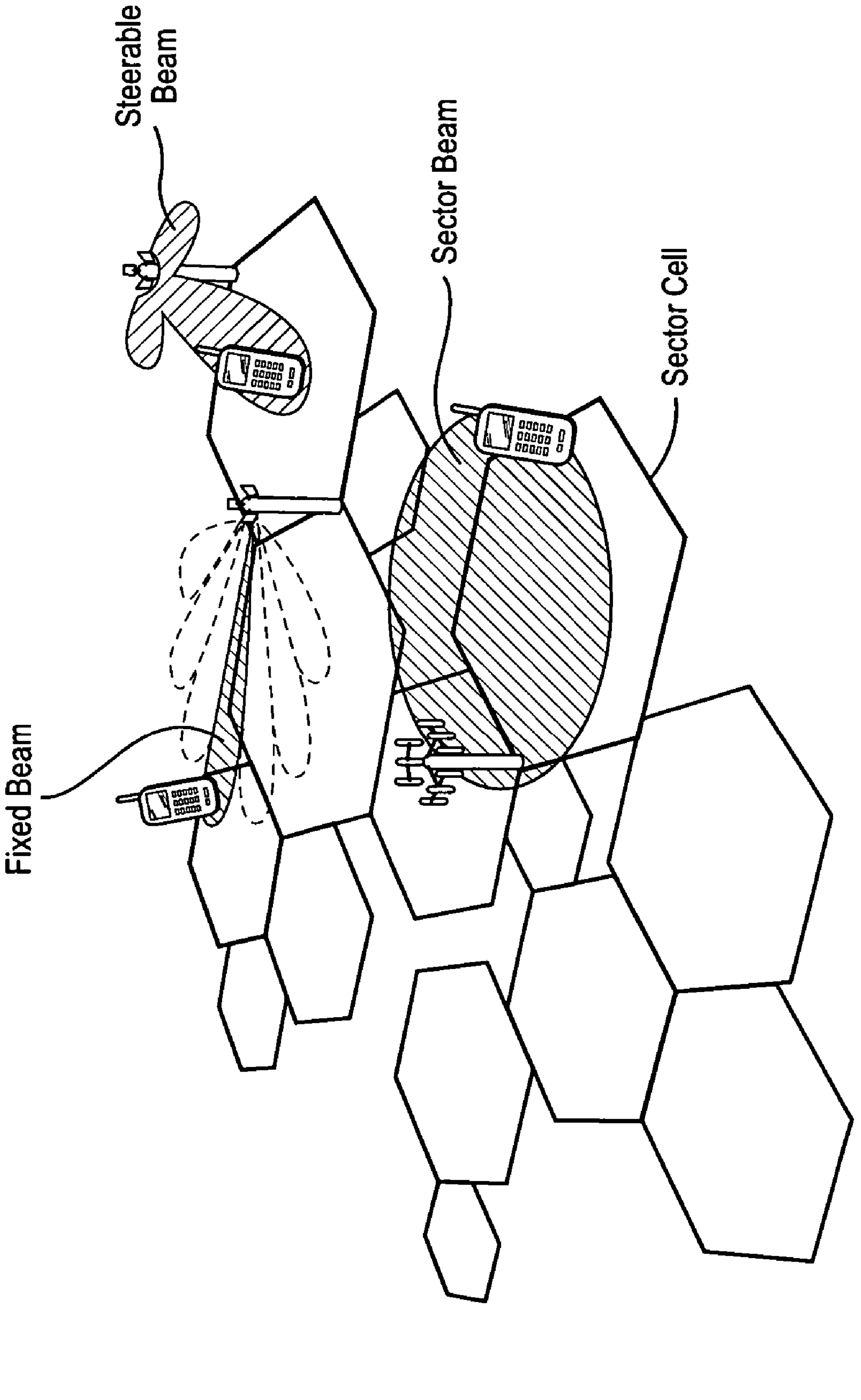
FIG. 2 illustrates a cellular network with a base station transmitting a sector beam, a base station transmitting a multi-beam, and a base station transmitting a steerable beam.

FIG. 2 illustrates a cellular network with a base station transmitting a sector beam in one sector cell, a base station transmitting a fixed multi-beam antenna pattern in another sector cell, and a base station transmitting a steerable beam in a third sector cell. Both FIGS. 1 and 2 illustrate how adaptive antennas spread less interference in the downlink direction and suppress spatial interference in the uplink direction. This increases the signal-to-interference in both uplink and downlink directions, and therefore, increases overall system performance.

Figure 3:
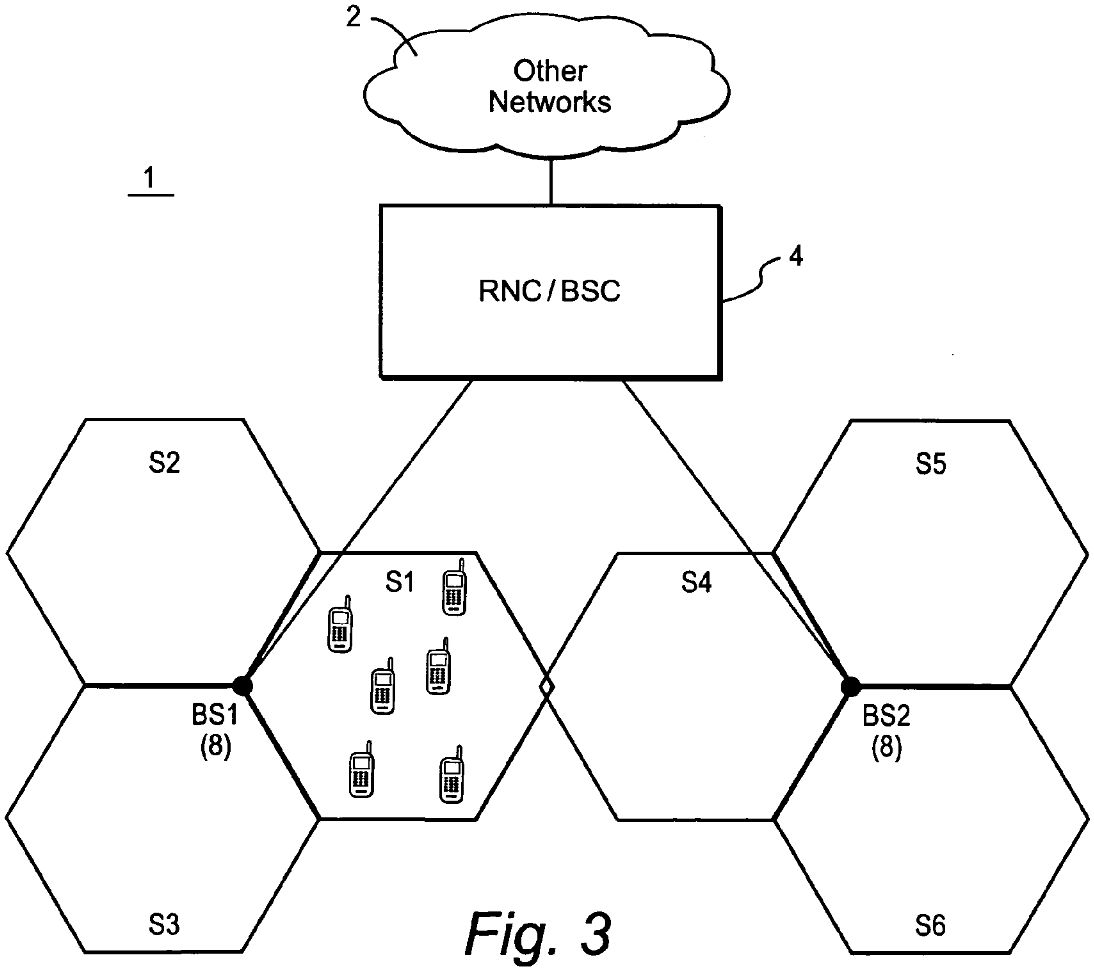
FIG. 3 illustrates a cellular communication system.

An example cellular system 1 is shown in FIG. 3 in which the present invention may be employed. A radio network controller (RNC) base station controller (BSC) 4 is coupled to multi base stations 8 and to other networks represented by a cloud 2. Each illustrated base station BS1 and BS2 services multiple sector cells. Base station BS1 services sector cells S1, S2, and S3, and base station BS2 services sector cells S4, S5, and S6.

Figure 4:
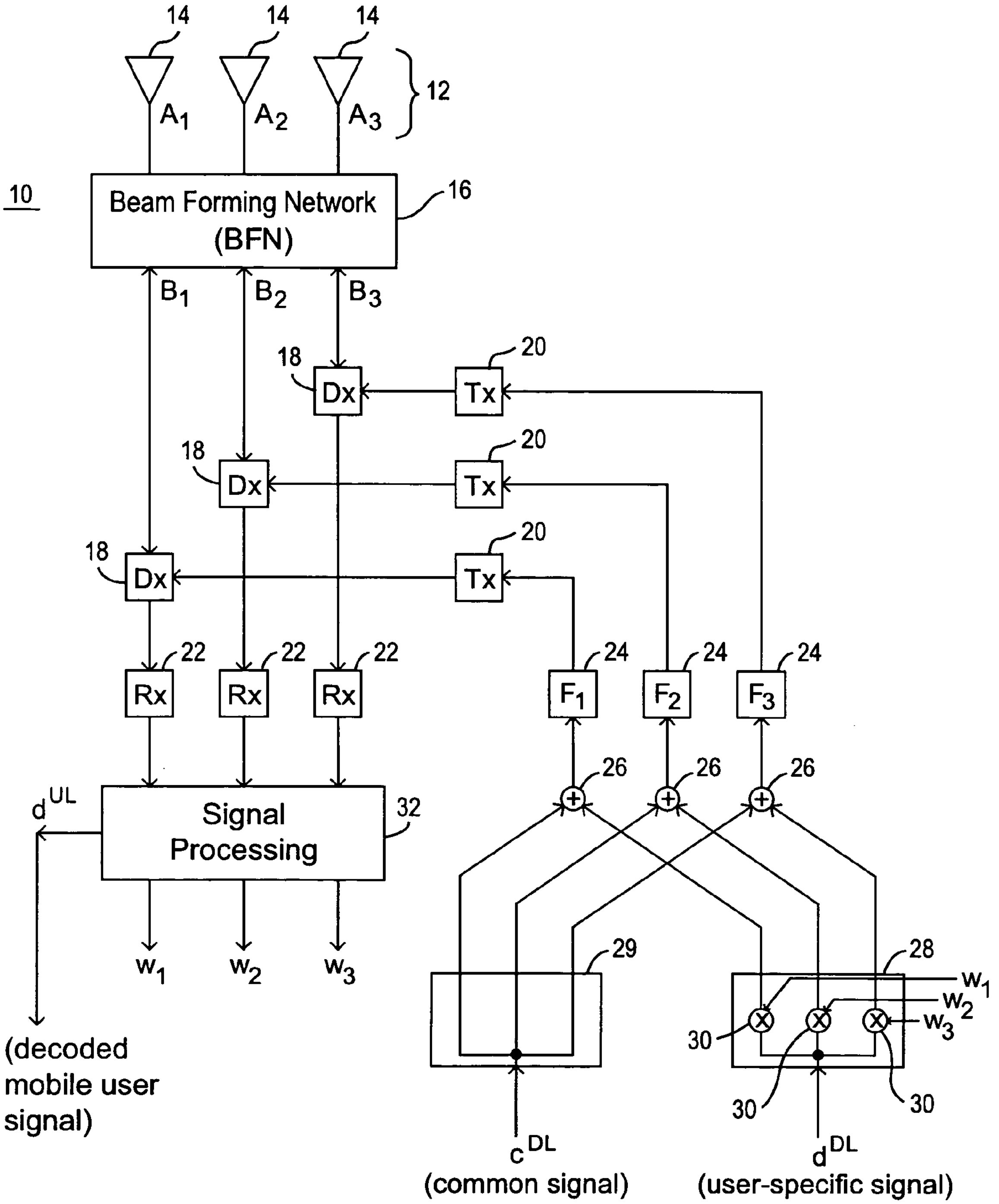
FIG. 4 illustrates an antenna system in accordance with a mixed beam example embodiment.

An antenna system in accordance with a mixed beam, non-limiting, example embodiment is now described in conjunction with FIG. 4. The antenna system 10 includes an antenna array 12 with multiple antenna elements 14. The antenna array 12 includes an odd integer number N of antenna elements designated $A_1, A_2, \ldots, A_N$. In the example of FIG. 4, N=3. A single beam forming network (BFN) 16 generates N narrow beams. The same beams are used for both uplink and downlink. A beam forming network is a multiple input, multiple output port device. Each beam forming network port corresponds to one of the narrow beams of the multi-beam antenna system. A beam forming network may include active or passive components. With passive components, the beams are designed during the manufacturing process and remain fixed. For active components, the beams may be steered adaptively. A well-known, suitable, passive beam forming network operating in the radio frequency (RF) range that produces multiple narrow beams from an array of uniformly spaced antenna elements is a Butler matrix.

The beam forming network 16 in FIG. 4 operates in both transmission and reception directions. A signal to be transmitted is connected to one of the input ports of the beam-forming network 16 which then directs the signal and transmits it on all antenna elements. Depending upon the input port chosen, each signal designated to a particular antenna element is subject to a particular phase rotation. The overall result is that the main lobe or beam is generated at a certain direction. When an alternative beam port is used, the beam appears in another direction. In short, the output of the antenna elements is a formed beam.

Each beam input to the beam forming network is coupled to a corresponding duplex filter (Dx) 18. Duplex filters 18 provide a high degree of isolation between the transmitter and the receiver and permit one antenna to be used for both uplink reception and downlink transmission. Each beam also has a corresponding transmitter (Tx) 20 coupled to a corresponding duplex filter 18. The transmitter 20 typically includes power amplifiers, frequency up-converters, and other well-known elements. Each duplex filter 18 also is coupled to a corresponding receiver (Rx) 22. Each receiver 22 typically includes low noise amplifiers, intermediate frequency down-converters, baseband down-converters, analog-to-digital converters, and other well-known elements. The outputs from the receivers 22 are provided to a signal processor 32 which decodes the received signal from a mobile user and generates an output shown as $d^{UL}$. The signal processor 32 also generates N beam weights ($w_n$) to be applied to user-specific signals as shown in the weighting block 28.

The user-specific signal, shown as $d^{DL}$, is input to the weighting block 28 which includes N multipliers 30 for multiplying the user-specific signal with a corresponding beam weight $w_n$. The common signal $c^{DL}$ is split into N copies of the common signal by a signal splitter 29 but is not weighted in this example. Each weighted, user-specific signal and the common signal are summed at a corresponding summer 26, where each summer 26 is associated with one of the beams. The output of each summer 26 is forwarded to a beam filter ($F_n$) 24, each beam having its own beam filter 24. The output of each beam filter 24 is then provided to its corresponding transmitter 20.

The beam generated from one antenna element, the center element $A_2$ in this example embodiment, will be wide. When two or more antenna elements are used in the antenna array, the generated beam can be narrower. In contrast with conventional, fixed-beam systems where the single uplink beam with the strongest average received power is used to transmit user-specific signals in the downlink, the user-specific signals are transmitted in the downlink on all beams.

One of the benefits of the mixed beam embodiment is that the user-specific and common signals are approximately in-phase and time-aligned (1) at the center antenna element in the base station antenna array, and (2) when they are received at each mobile user. The primary common pilot signal, an example common signal, is typically used for measurements and as a phase reference, and for those reasons, it typically is transmitted over the entire sector cell. The pilot signal includes a known data sequence which each mobile uses to estimate the radio propagation channel. As the mobile moves, the radio propagation channel also changes. Regardless of changes in the channel, an accurate radio channel estimate (determined from the received common signal) is needed in order for the mobile station to detect and decode the user-specific data transmitted in a narrower beam.

Common signals, such as primary common pilots, paging, etc., are transmitted simultaneously on all beams with equal power. The common signal is split by splitter 29 and applied to each beam path via a corresponding summer 26 to the associated beam specific transmit filter 24. Each filter 24 is designed in one example of the mixed beam embodiment so that the common signal is transmitted only by the center antenna element 14 of the antenna array 12. The filters 24 in one example implementation may cancel the common signals in all outputs of the beam forming network 16 except for the output to the center antenna, which in this case is antenna $A_2$. Each beam specific transmit filter 24 compensates for distortions in the radio chain starting from baseband frequency up to the output of the beam forming network 16. The transmit filters 24 are designed to ensure that the user-specific signals and the common signals are in-phase and time-aligned at the center antenna element $A_2$.

Unlike the common signals which are transmitted with equal power on all downlink beams in this embodiment, the user-specific signals are weighted with a user-specific beam weight $w_n$ applied to each downlink beam. Each user-specific transmit $w_n$ applied to downlink beam n is chosen to be a function of the uplink average received power $p_n$. An example of such a function can be expressed for n=1, 2, . . . , N with α, β, and $\bar{p}$ real positive numbers as follows:

$$w_n=\alpha(p_n+\bar{p})^{\beta} \quad \text{Equation 1:}$$

Here, $p_1$, $p_2$, and $p_3$ denote the average uplink powers on beams 1, 2 and 3, respectively. The average uplink powers depend on the radio channel statistics and the antenna array design. It may be assumed that the average downlink powers are approximately the same as the average uplink powers. As one example, the beam weights are selected as proportional to the square root of the received energy, $\bar{p}=0$ and $\beta=½$.

Signals from all beams in the uplink direction received via the beam forming network 16, duplexers 18, and receivers 22 are combined in the signal processor 32 to yield an estimate of the decoded uplink signal $d^{UL}$. In addition, the average uplink powers $p_n$ for each beam are measured and used by the signal processor 32 to calculate the beam specific weights $w_n$ in accordance with the above equation. The average uplink beam powers give information about the mean angle of arrival and the scattering in the radio environment of the desired incoming signal. The mean direction of arrival is approximately equal to the mean direction of departure of the desired signal.

This example of the mixed-beam embodiment ensures that the common signals are transmitted on the center, wide-covering antenna element of the antenna array 12, and that the user-specific signals are transmitted from all antenna elements 14 in the antenna array 12. The beam specific weights $w_n$ direct the radiated energy towards the desired user via a narrower directed beam which limits the interference caused by that beam to other mobile users. No separate sector antenna is required. Nor does a separate, secondary pilot signal need to be transmitted on each beam. And no pilots on the dedicated channels are required.

Figure 5A:
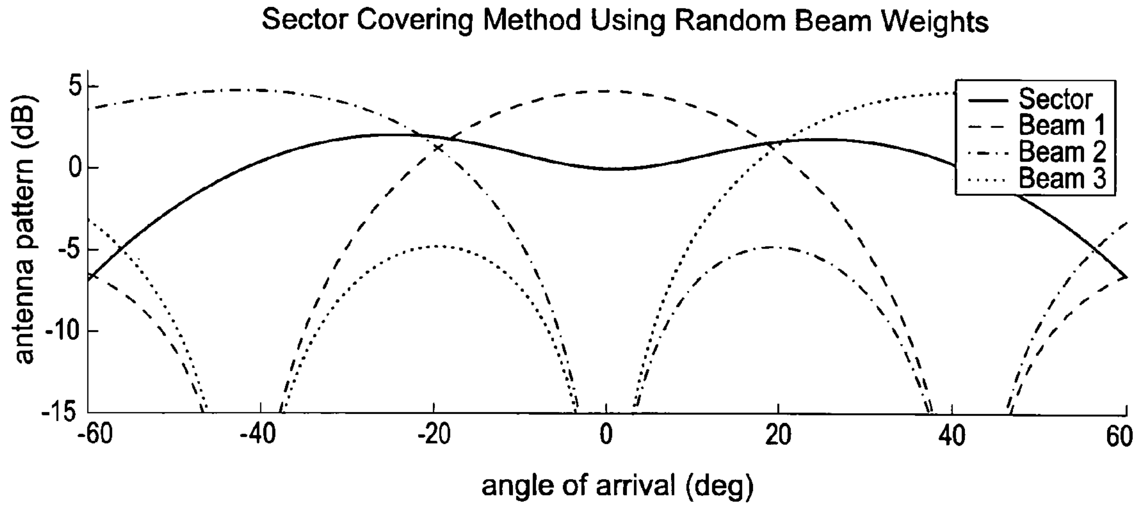
FIGS. 5A-5D illustrate beam patterns for the synthesized sector covering beam and the narrow beams as well as the relative phase offset between the synthesized sector beam and a narrow beam as a function of direction of arrival.
Figure 5B:
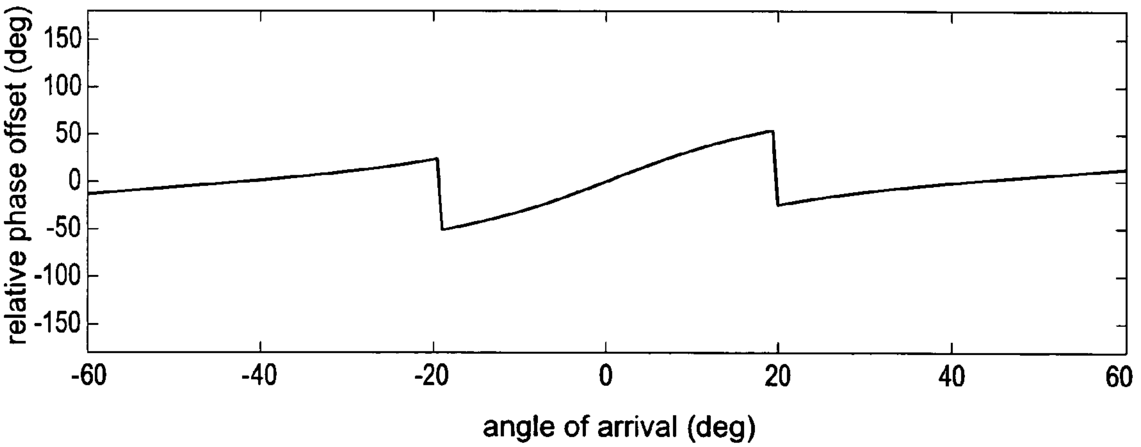
Figure 5C:
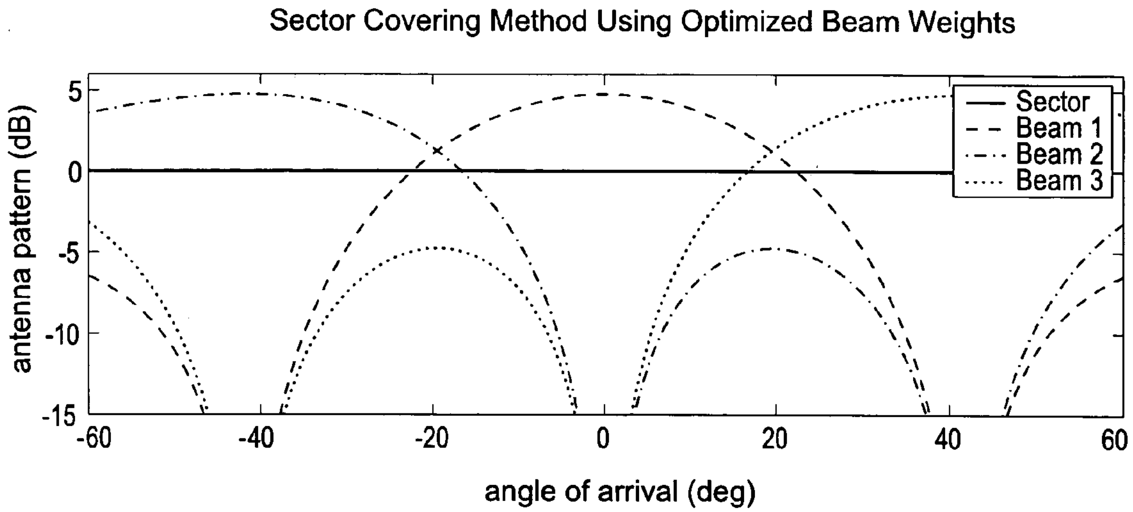
Figure 5D:
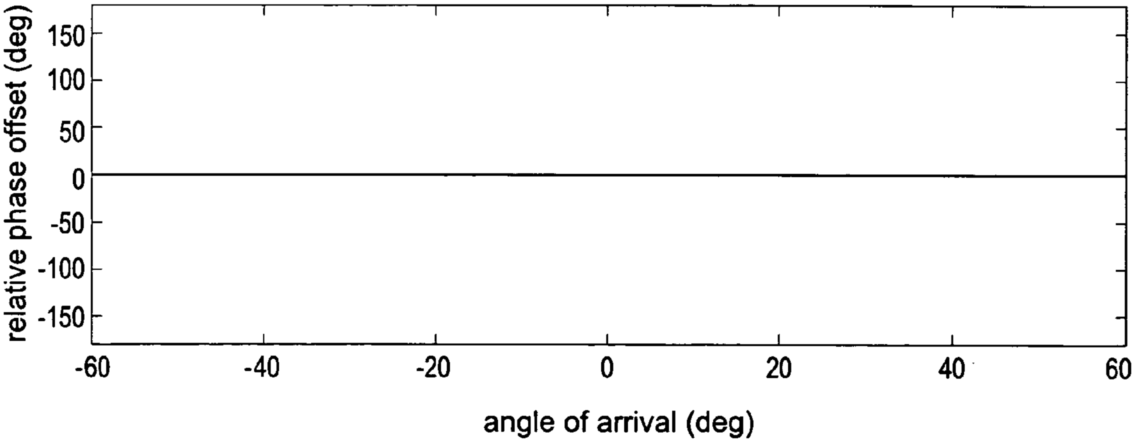

To illustrate advantages of the mixed-beam embodiment of FIG. 4, the graphs in FIGS. 5A-5D compare the relative antenna gain and phase offset between a sector covering beam and one of the fixed, narrow beams as a function of direction of arrival. FIGS. 5A and 5B employ a non-optimized, random beam weights to transmit the common signal as outlined in the following: Martinex-Munoz, "Nortel Networks CDMA Advantages of AABS Smart Antenna Technology," *The CDG Technology Forum*, Oct. 1, 2002, the contents which are incorporated by reference. FIGS. 5C and 5D employ beam specific transmit filters 24 tuned so that the common signal is transmitted from the center antenna only. The relative phase offset is measured near the antenna array and not at the mobile user location.

The relative phase offset between user-specific signal transmitted in the best beam and the common signal is zero over the entire angle of arrival for the sector cell. For the non-optimized beam weights, the relative phase offset and amplitude vary significantly depending on the angle of arrival. Thus, in this simple case with no angular spread, the mixed beam embodiment offers a smooth and stable sector covering beam as well as phase alignment between a common signal and a user-specific signal. With the mixed beam embodiment, a common channel can be used for channel estimation with no degradation due to phase offsets. On the other hand, an embodiment solution random beam weights will suffer quality degradation due to larger phase offset variations.

Figure 6A:
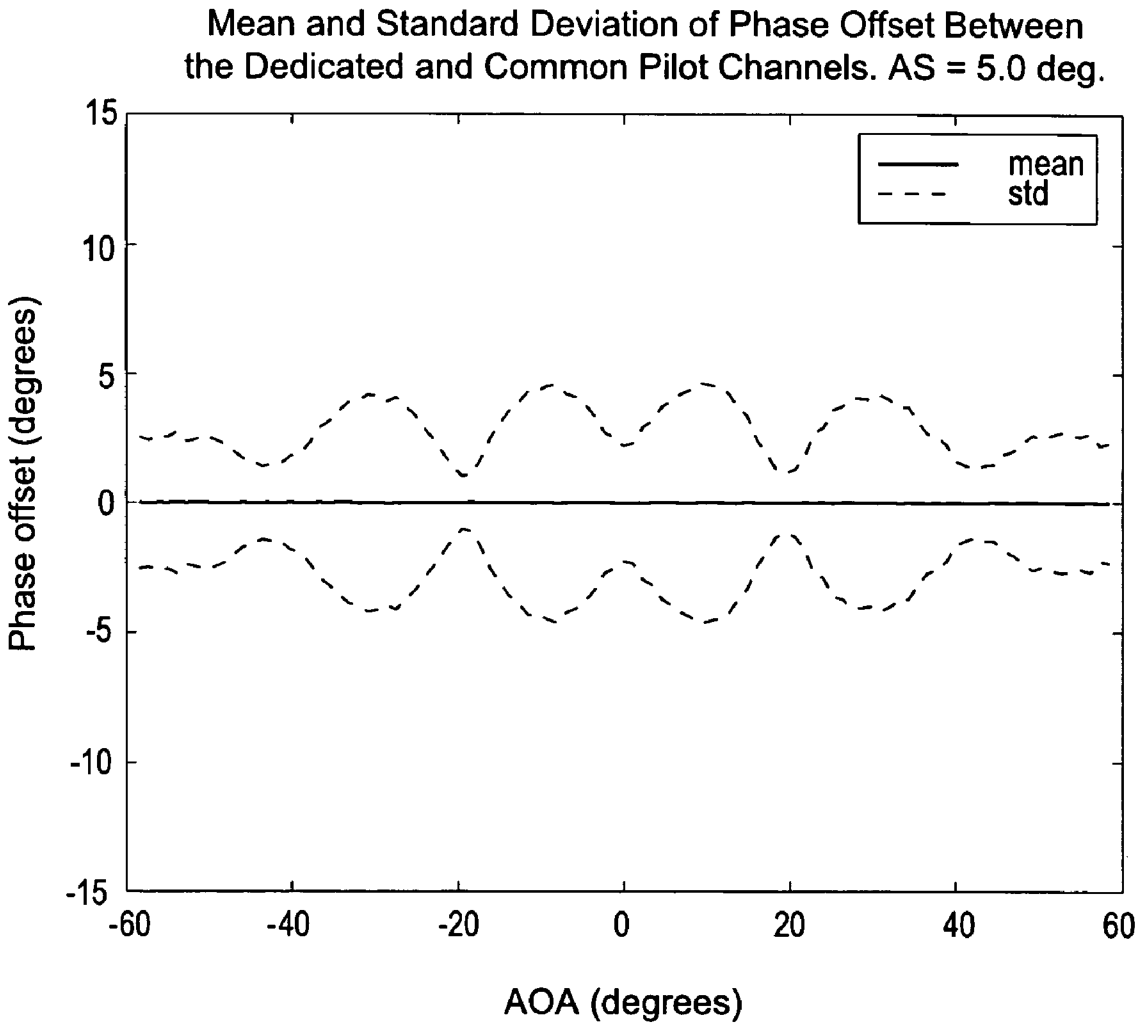
FIGS. 6A-6B illustrate relative phase offset between the received common signal and a received user-specific signal as a function of mobile direction.
Figure 6B:
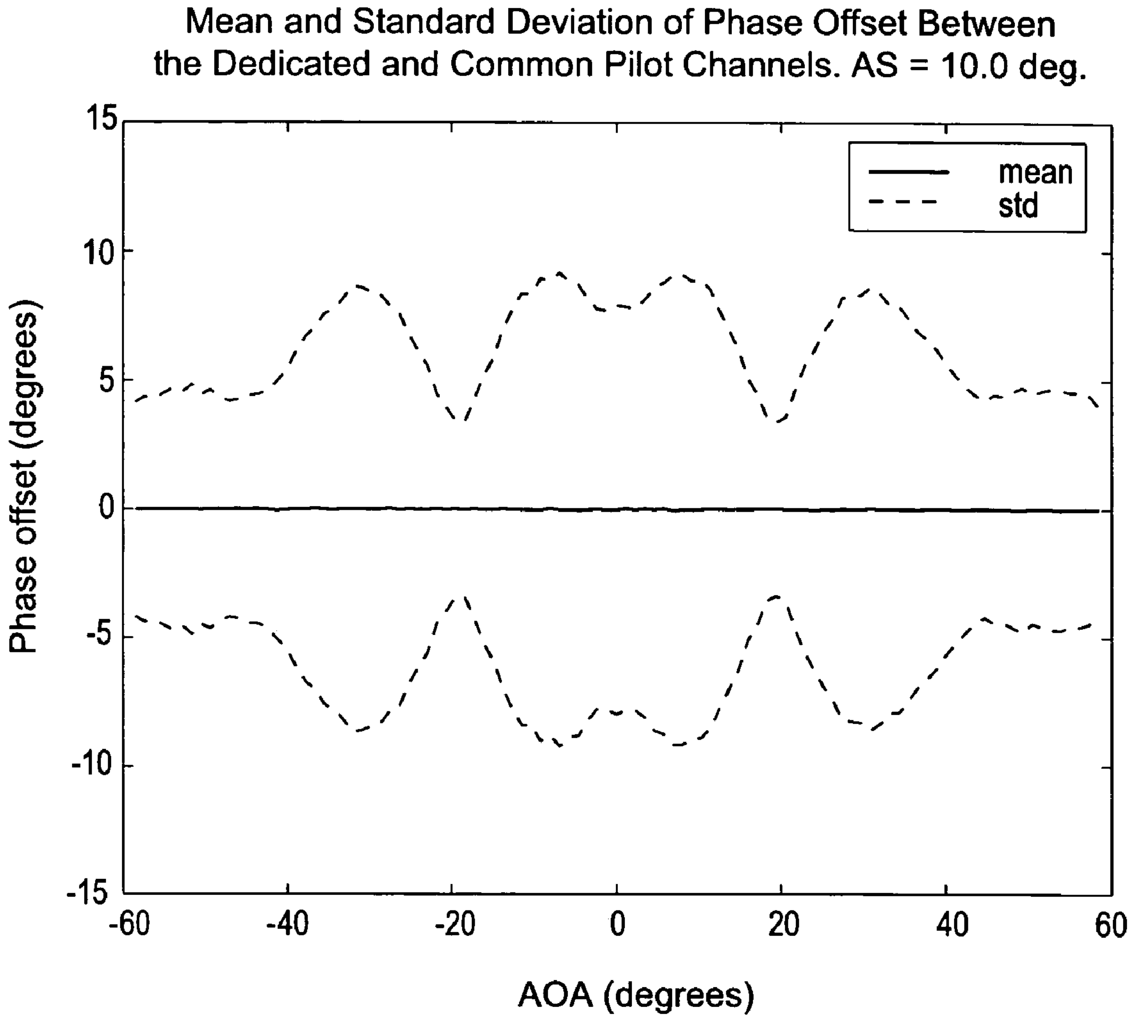

FIGS. 6A and 6B illustrate the mean and standard deviation of the relative phase offset as seen by the mobile terminal between the user-specific and common signals for angular spreads of 5 and 10 degrees. The signals are transmitted using the mixed-beam example embodiment of FIG. 4. The beam weights are chosen according to Equation 1 above with $\bar{p}=0$ and $\beta=\frac{1}{2}$. Despite the angular spread, the mean of the phase offset is zero, and the standard deviation is relatively small, causing only modest performance degradation for all mobile terminals in the sector cell when the common channel is used as phase reference for channel estimation.

Figure 7:
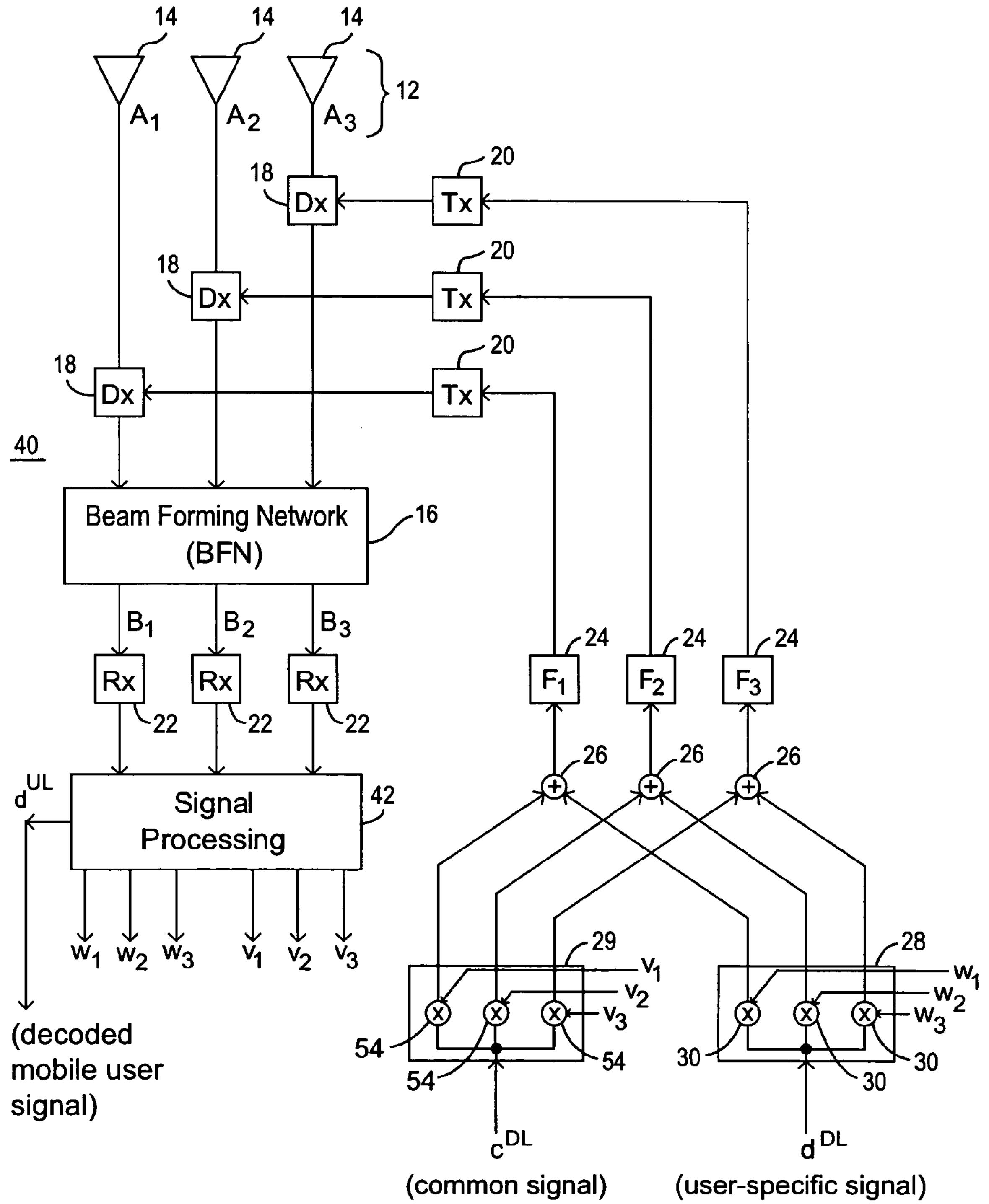
FIG. 7 illustrates an antenna system in accordance with a steered beam example embodiment.

A second, non-limiting, example embodiment, referred to hereafter as the steered-beam embodiment, is now described in conjunction with the antenna system 40 illustrated in FIG. 7. Like reference numerals refer to like elements throughout the figures. Both the user-specific and common signals are weighted by choosing the beam forming weights $w_1$-$w_3$ (user-specific) and $v_1$-$v_3$ (common) as arbitrary complex numbers, the resulting beam patterns for both the user-specific and common signals can be steered in arbitrary directions with more flexibility as compared to the mixed beam embodiment. The antenna array 12 may include an even or odd number N of antenna elements 14. So the three antenna elements A1-A3 shown are only an example.

The beam forming network 16 in the steered-beam embodiment 40 is not necessary in the transmit direction. Hence, the beam forming network 16 is placed between duplexers 18 and the receivers 22 and is used to form the received beams $B_1$, $B_2$, and $B_3$ processed by the receivers 22 and the signal processor 42. The signals to be output by the transmitters 20 are provided to their corresponding antenna element 14 via corresponding duplexer 18 without being processed by the beam forming network 16. The beam forming network 16 is optional in the steered-beam embodiment for receiving mobile user signals.

In contrast to the mixed-beam embodiment, each antenna $A_n$ is directly associated with a corresponding antenna-specific transmit filter ($F_n$) 24. Signals designated to be transmitted on the nth antenna element first pass through the nth filter ($F_n$) 24. The antenna-specific transmit filters 24 are designed so that common and user-specific baseband signals arrive on each antenna without distortion in gain, phase, and timing that might otherwise result from baseband-to-RF conversion. The filtering circuitry together with the beamforming weights for the user-specific signal also ensure that the user-specific and common signals are time-aligned and have a controlled phase difference when received at each mobile user in the cell. This allows each mobile user to use the common signal as a phase reference for channel estimation and demodulation. Recall that the signals received at the mobiles in the mixed beam embodiment are approximately in-phase. In the steered beam embodiment, the phase error or difference between the user-specific and common signals received at each mobile is controlled to obtain a good tradeoff between required transmit power, radiated interference, and quality of service to the users.

The effect of the phase difference in the steered beam embodiment depends on noise and interference in both the channel estimate as well as the user-specific signal to be demodulated. From a system point of view, it may not make sense to minimize the phase difference if the effects of noise and interference are dominating how well the user-specific signal is being demodulated and decoded at a mobile terminal. Thus, the filter and beamforming weight optimization can take into account the effect of noise and interference as well as the expected operating conditions. One example beam weight optimization approach selects the user-specific beam weights so that the correlation between the resulting channels is real so that its magnitude is maximized subject to a norm constraint on the weight vector. A more sophisticated approach is to minimize the norm of the beam weight vector while ensuring that the correlation coefficient is equal (or greater) than a certain target value. Noise and interference levels can either be estimated, set as planning parameters, or considered as variables that can be adjusted while operating the system.

Figure 8:
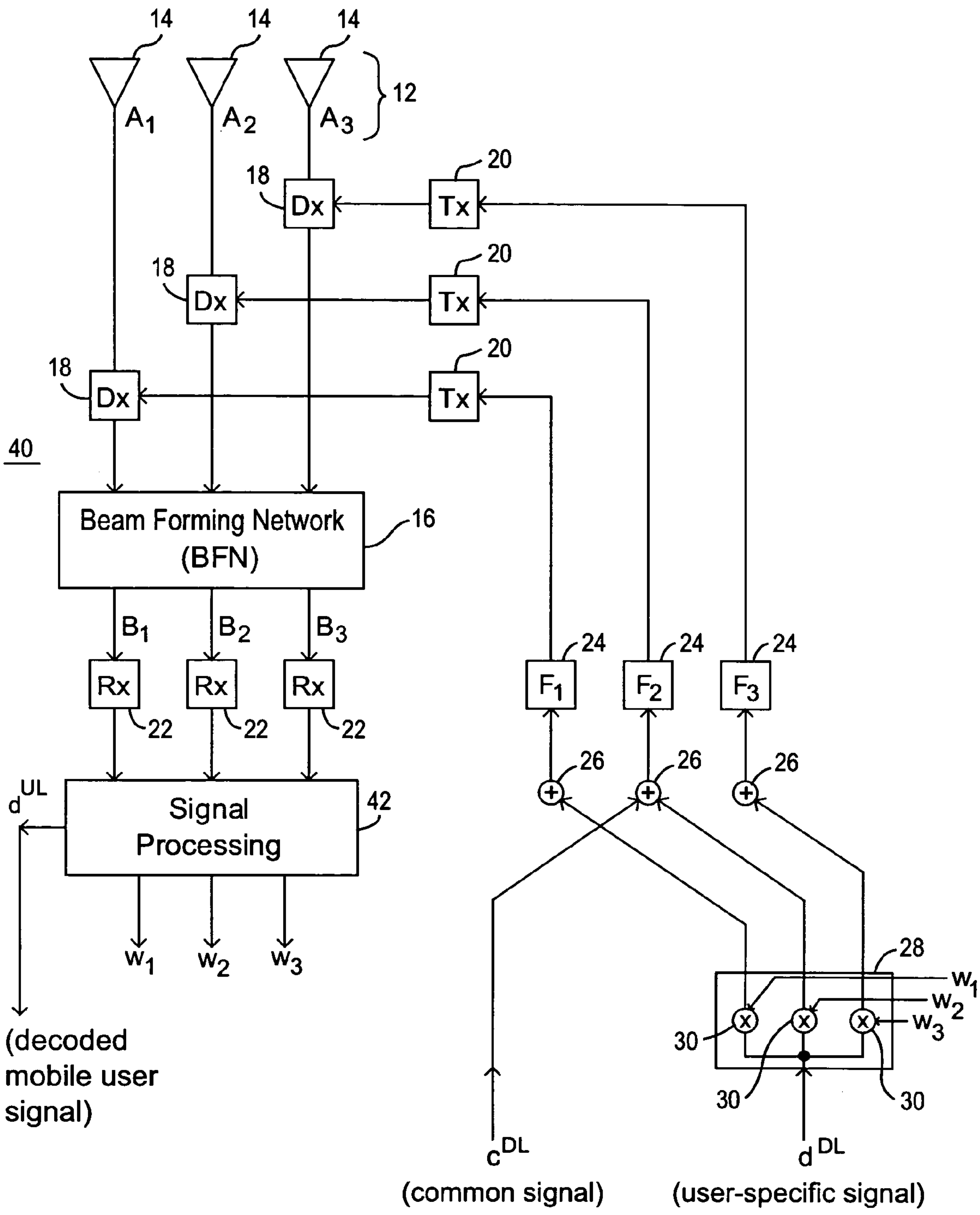
FIG. 8 illustrates an antenna system in accordance with a special case of the steered beam example embodiment.

Common signals may be transmitted on all antenna elements. They may alternatively only be transmitted on a central antenna element in the special case shown in FIG. 8. This may be accomplished, for example, by setting common signal beam weights $v_1$ and $v_3$ to zero. In this special case, the common signal $c^{DL}$ is provided only to one of the antenna element paths via its corresponding summer 26 to the center antenna element $A_2$. In both FIG. 7 and FIG. 8 steered beam implementations, the user-specific signals are transmitted on all antenna elements and are weighted using corresponding user-specific beam weights $w_n$.

The beam forming weights $w_n$ and $v_n$ may be, for example, complex numbers used to phase rotate and amplify their respective user-specific or common signal. Each mobile user has its own set of beam weights $w_n$. From received signals in the uplink, the signal processor estimates directions and channel statistics of the mobile users in the cell, and from this information, decides on a wide beam shape to be used in the downlink to ensure all mobile users in the cell receive the common signal with satisfactory signal strength. That wider beam shape depends on the beam weights $v_n$. Various methods for designing beam shapes are known to those skilled in the art. See, for example, *Smart Antennas for Wireless Communications: IS-*95 *and Third Generation CDMA Applications*, J. C. Liberti, and T. S. Rappaport, Rentice Hall PTR, 1999. Ultimately, the beam forming beam weights $w_n$ and $v_n$ permit the user-specific signal to be directed specifically to the mobile user and the common signal to be transmitted to all users in the cell.

These beam weights are preferably optimized so that the antenna array gain is maximized, the interference spread is minimized, and the common signal can be used as a phase reference by all mobile user in the cell. The beam weights $w_n$, n=1, 2, . . . N, and $v_n$, n=1, 2, . . . N, may be chosen so that the correlation between the channel experienced by the user-specific and common signals is real and so that the correlation magnitude is maximized subject to a norm constraint on the weights. That example approach is set forth in Equation (9) below.

Another beam forming weight optimization technique is to maximize the gain of the antenna array which can be viewed as minimizing the generated interference with a constraint on the phase difference at the mobile between the common and user-specific signals received at the mobile. Equation (13) below describes the optimization problem. The signal processor 42 predicts the phase error at the mobile based upon statistical models of the downlink channel in terms of the channel covariance matrix given in equation (7) below determined either by mobile feedback or base station measurements, the beam weights used for the common signal and possibly other feedback from the mobile station such as block error rate (BLER), noise level, and interference level.

Figure 9A:
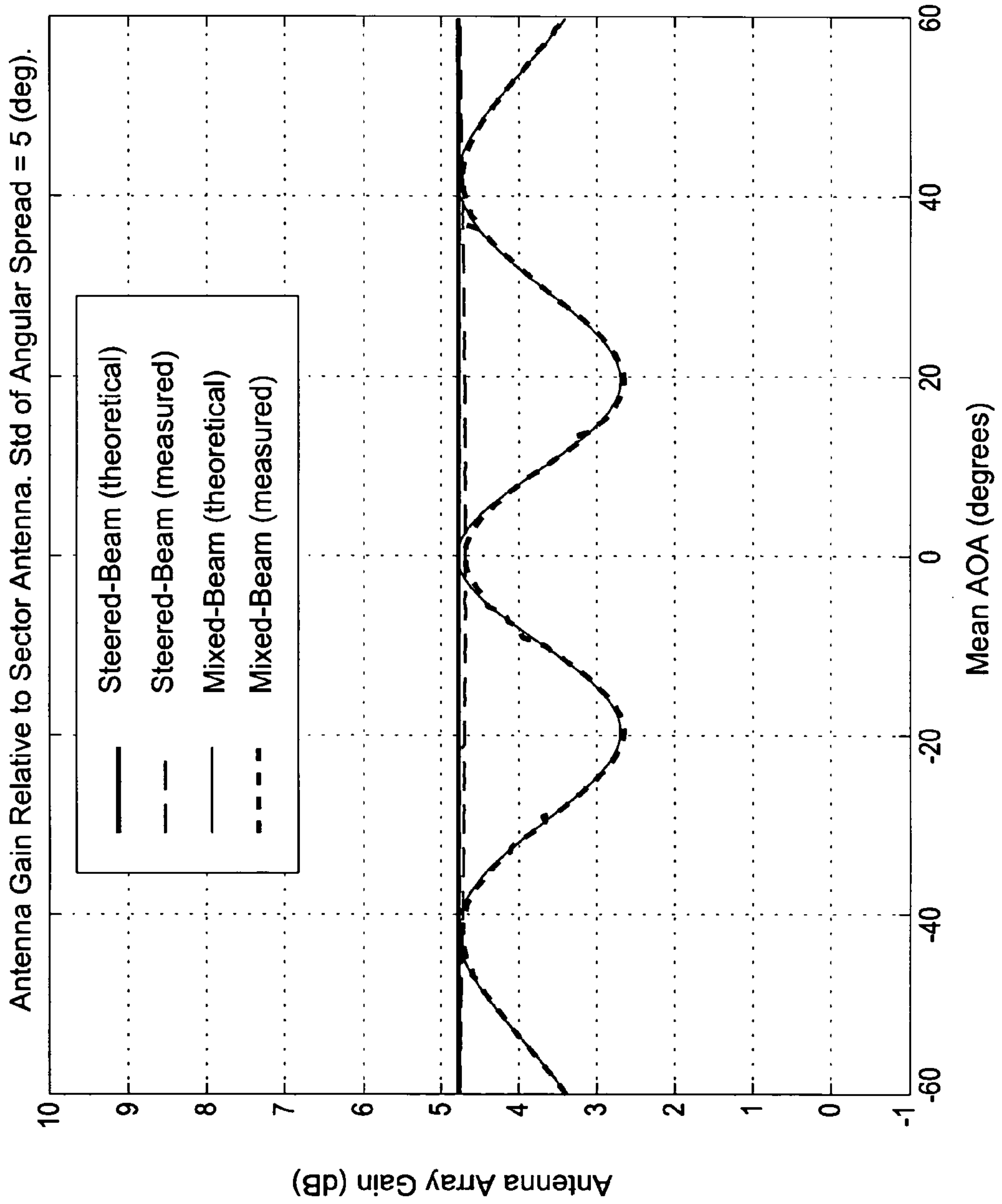
FIGS. 9A-9B illustrate performance of the mixed and steered beam example embodiments.
Figure 9B:
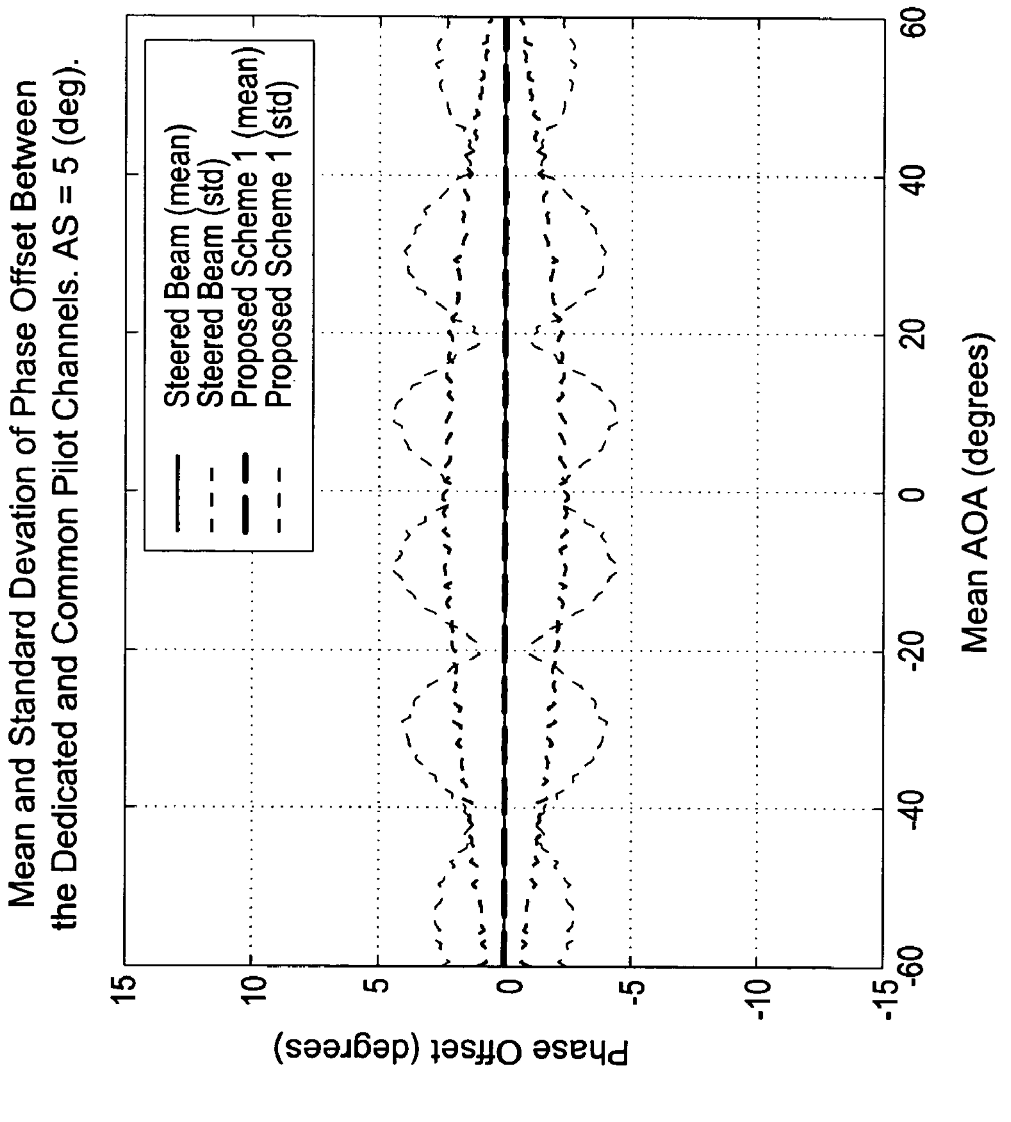

The graph in FIGS. 9A and 9B illustrate the performance of the mixed-beam and steered-beam example embodiments subject to an angular spread of five degrees. In FIG. 9A the antenna gains of both the mixed and steered beam embodiments relative to a sector antenna are presented assuming an antenna array of three antenna elements. The antenna gain for the steered beam embodiment is almost constant over the sector cell and as high or significantly higher than the gain with the mixed beam embodiment. FIG. 9B illustrates a relative phase offset between the received common and user-specific signals at the mobile station. The standard deviation of the phase difference in general is smoother and lower than for the mixed beam embodiment. The steered beam embodiment thus offers as good as and in most cases better performance as compared to the mixed beam embodiment Two, detailed, example approaches for optimizing beam forming weights for the steered beam embodiment are now described. Of course, other weight optimization approaches may be employed.

Let 2N+1 denote the number of antenna elements in the uniform linear antenna array. For simplicity, an odd number of antenna elements is considered to ease the notation, but the approach and optimization is not limited to this case. Two adjacent elements are separated by half a wavelength denoted by $\lambda/2$. The channel experienced by the common signal $r_c$ and the user-specific signal $r_d$ is modeled as:

$$r_c=v^H h \quad \text{Equation 2:}$$

$$r_d=w^H h \quad \text{Equation 3:}$$

where v and w are column vectors holding the transmit antenna weights for the common and user-specific signals, respectively. The signals from the multiple transmit antenna to the mobile is denoted by h. In particular, h is modeled as Equation 4:

$$h=\sum_{p=1}^{P}\alpha_p a(\theta_p)$$

where P, $\theta_p$, and $\alpha_p$ denote the number of propagation paths, the angle of arrival (or departure) of the pth path, and the complex path gains of the pth path, respectively. The antenna array response from a wave incident at an $\theta_p$ is given by Equation 5:

$$a(\theta_p)=\begin{bmatrix} e^{-j\pi N\sin\theta_p} \\ \vdots \\ e^{-j\pi\sin\theta_p} \\ 1 \\ e^{j\pi(N-1)\sin\theta_p} \\ \vdots \\ e^{j\pi N\sin\theta_p} \end{bmatrix}$$

Assumptions: The angles of arrival $\theta_p$ are independent and identically distributed (i.i.d.) random variables with $\theta_0$ mean and $\sigma_\theta^2$ variance. Let $f(\theta p|\theta_0, \sigma_\theta^2)$ denote the probability density function (pdf) of $\theta_p$. The pdf of $\theta$ is usually assumed to be Gaussian, uniform, or Laplacian. The complex path gains $\alpha_p$ are i.i.d. complex Gaussian random variables with zero mean and variance $\sigma_\alpha^2$. Furthermore, assume that the path gains and the angles of arrival are statically independent, and their joint distribution is given by:

Equation 6:

$$f(\theta_1, \ldots, \theta_p, \alpha_1, \ldots, \alpha_p)=\prod_{p=1}^{P} f(\theta_p \mid \theta_0, \sigma_p^2)CN(\alpha_p; 0, \sigma_\alpha^2)$$

where $CN(x:\mu,\sigma^2)$ denotes that x is distributed as a complex Gaussian random variable with mean $\mu$ and variance $\sigma^2$. Without loss of generality, we assume that $\sigma_\alpha^2=1/P$.

The correlation between the dedicated and the common channels is given by:

$$\rho=E\{r_c r_d^H\}=v^H R w \quad \text{Equation 7:}$$

where R denotes the channel covariance matrix, which is given by:

$$R=E\{hh^H\}=E\{\alpha(\theta)\alpha^H(\theta)\} \quad \text{Equation 8:}$$

The correlation depends on the angle of $\theta_0$ and the angular spread. As an example only, let the common signal be transmitted on the center antenna. That is $v=[0_{1\times N}, 1, 0_{1\times N}]^H$.

The transmit antenna weights w could be chosen such that the correlation $\rho$ is real and maximized for a norm constraint on the weights. This leads to the following:

$$w=kRv \quad \text{Equation 9:}$$

where k is a real positive value chosen to fulfill the chosen norm constraint.

The pdf, $f(\theta)$ of the relative phase $\theta$ between two correlated zero-mean Gaussian random variables X and Y has been derived analytically in J. G. Proakis, *Digital Communications,* 3rd Ed., McGraw-Hill, 1995. Let $\mu$ denote the correlation coefficient between X and Y, that is:

Equation 10:

$$\mu=\frac{E\{XY^H\}}{\sqrt{E\{|X|^2\}E\{|Y|^2\}}}=|\mu|e^{-j\varepsilon_\mu}$$

Then, as shown in the Proakis text just-referenced:

Equation 11:

$$f(\theta \mid \mu)=\frac{1-|\mu|^2}{2\pi}\left\{\frac{1}{1-|\mu|^2\cos^2(\theta-\varepsilon_\mu)}+\frac{|\mu|\cos(\theta-\varepsilon_\mu)}{(1-|\mu|^2\cos^2(\theta-\varepsilon_\mu))^{3/2}}\cos^{-1}(-|\mu|\cos(\theta-\varepsilon_\mu))\right\}$$

Replacing X and Y by $r_c$ and $r_d$, respectively, and accounting for noise in a channel estimate as well as noise in the demodulation process, the correlation coefficient between the dedicated and the common channels is given by:

Equation 12:

$$\mu(w) = \frac{E\{r_c r_d^H\}}{\sqrt{E\{|r_c|^2\} + \sigma_{cc}^2}\sqrt{E\{|r_d|^2\} + \sigma_d^2}} = \frac{v^H R(\theta_0) w}{\sqrt{(v^H R(\theta_0) v + \sigma_c^2)(w^H R(\theta_0) w + \sigma_d^2)}}$$

where $\sigma_c^2$ and $\sigma_d^2$ represent the noise in the channel estimate and the noise in the received user-specific signal to be demodulated. The noise levels may be estimated or taken as parameters and be updated. It is clear that standard deviation of the phase offset is determined by the correlation coefficient. Further, for PSK signaling, the coefficient also determined the bit error probability. A possible optimization procedure is then to minimize the norm of w subject to the constraint that the cross correlation coefficient is real and that the magnitude is equal or greater than a target value, $\mu_{target}$, which determines the standard deviation and the bit error probability:

Equation 13:

$$\min w^H w$$

$$s.t. \mu(w)^2 \geq \mu_{target}^2, \ \mathrm{Im}\ \mu = 0$$

This is straightforward using Lagrange multipliers. It is also possible to include other constraints, e.g. to minimize the interference is spread in certain directions.

Figure 10:
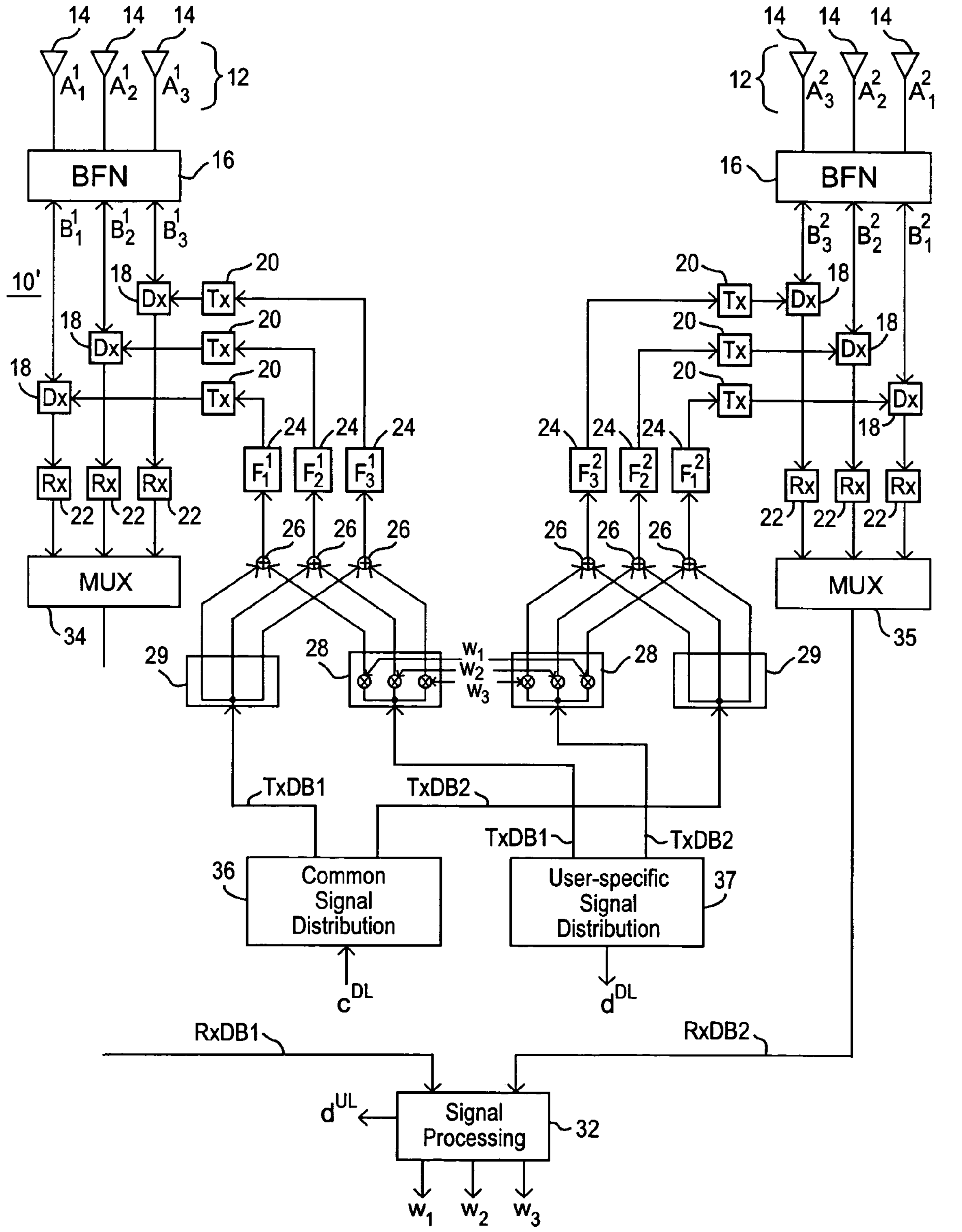
FIG. 10 illustrates an example, mixed-beam, diversity embodiment.

A third example, non-limiting embodiment combines the mixed-beam embodiment with transmit and receive diversity as illustrated in FIG. 10. But the mixed-beam embodiment may be combined just with transmit diversity or just with receive diversity. Diversity can be implemented with antennas of different polarization, spatial separation, or by other well-known techniques. Combining transmit diversity and beam forming reduces the interference that otherwise would occur when diversity signals are transmitted throughout the cell. It is thus possible to benefit from both a diversity gain and an antenna gain.

Like reference numerals refer to like elements already described above, with the following exceptions. The left-side of FIG. 10 includes a transmit diversity branch 1 (TxDB1) and a receive diversity branch 1 (RxDB1). The right-side of FIG. 10 illustrates the second transmit and receive diversity branches TxDB2 and RxDB2. The common signal distribution block 36 distributes the common signal to both transmit diversity branches. Similarly, the user-specific signal distribution block 37 distributes the specific signals to both transmit diversity branches. Multiplexers 34 and 35 multiplexes all the received signals into the two received signal streams which are processed by the signal processor 32 to generate a decoded mobile user signal $d^{UL}$ as well as the beam-specific beam weights $w_n$.

Figure 11:
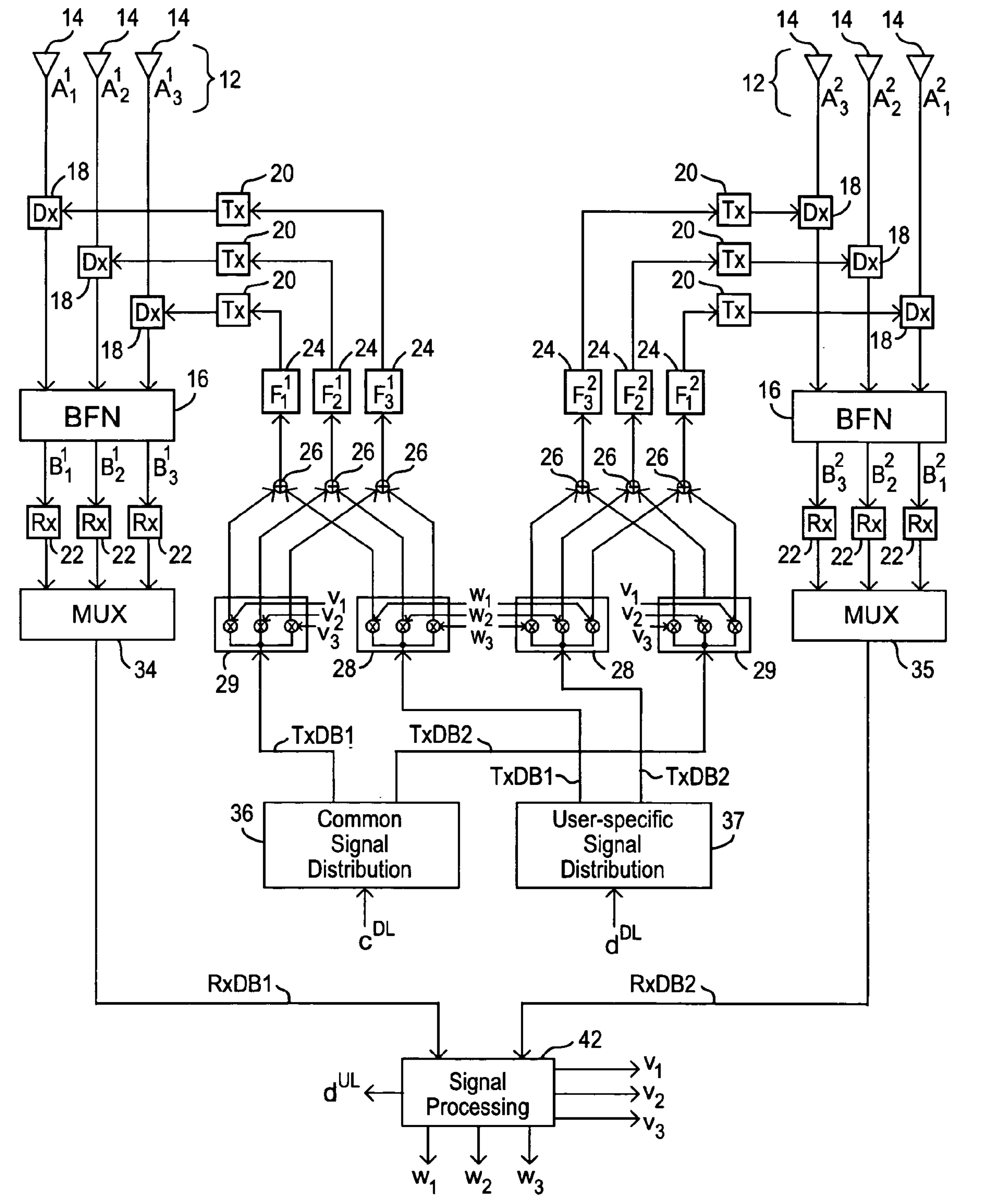
FIG. 11 illustrates an example, steered-beam, diversity embodiment.

FIG. 11 illustrates a fourth, non-limiting, example embodiment which is the steered-beam embodiment incorporating both transmit diversity and receive diversity. But the steered beam embodiment may be combined just with transmit diversity or just with receive diversity. Diversity can be implemented with antennas of different polarization, spatial separation, or by other well-known techniques. The various diversity branches are labeled in FIG. 11.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An apparatus in a transmitter, comprising:

an antenna array including multiple antenna elements for transmitting a wide beam covering a majority of a sector cell that includes a common signal and at least one narrow beam covering only a part of the sector cell that includes a mobile user-specific signal;

transmitting circuitry coupled to the antenna array; and circuitry, coupled to the transmitting circuitry, for ensuring that the user-specific signal and the common signal are substantially in-phase and substantially time-aligned, wherein the circuitry is configured to compensate the user-specific signal before transmission so that the common signal received by a mobile receiver can be used by the mobile receiver to perform channel estimation without having to use the mobile user-specific signal to perform the channel estimation.

2. The apparatus in claim 1, wherein the circuitry includes filtering circuitry configured so that the common signal is transmitted only from a center antenna element in the antenna array.

3. The apparatus in claim 1, wherein the circuitry is configured to ensure that the user-specific signal is in-phase and time-aligned with the common signal at a center antenna element in the antenna array.

4. The apparatus in claim 1, wherein the circuitry includes filtering circuitry configured to compensate distortions in the common signal and the user-specific signal associated with conversion of the common signal and the user-specific signal from baseband frequency to radio frequency.

5. The apparatus in claim 1, wherein the antenna array includes an odd number N of antenna elements, where N is a positive integer greater than 1, the apparatus further comprising:

a beam forming network, coupled between the antenna array and transmitting circuitry, for receiving the user-specific signal and the common signal and generating N narrow beams to be provided to the antenna array.

6. The apparatus in claim 5, further comprising:

receiving circuitry coupled to the beam forming network;

a signal processor, coupled to the receiving circuitry, for processing signals received on the N beams to estimate a received signal and for determining an average uplink received signal power for each beam.

7. The apparatus in claim 5, wherein the beam forming network is configured to transmit the common signal simultaneously on the N beams with equal or approximately equal power.

8. The apparatus in claim 7, wherein the beam forming network is configured to transmit the user-specific signal simultaneously on the N beams with a power that is determined using N user-specific beam weights, each user-specific beam weight corresponding to one of the N beams, such that a beam narrower than a beam radiating the common signal is radiated in a direction of the user.

9. The apparatus in claim 8, wherein each user-specific beam weight is proportional to a function of an uplink average signal power received on the corresponding beam.

10. The apparatus in claim 7, further comprising:

first and second antenna arrays each including an odd number N of antenna elements, where N is a positive integer greater than 1, for transmitting a wider beam covering a majority of a sector cell that includes the common signal and at least one narrower beam covering only a part of the sector cell that includes a mobile user-specific signal;

first transmitting circuitry coupled to the first antenna array;

second transmitting circuitry coupled to the second antenna array;

a first beam forming network, coupled between the first antenna array and the first transmitting circuitry, for receiving the user-specific signal and the common signal and generating N narrow beams to be provided to the first antenna array;

a second beam forming network, coupled between the second antenna array and the second transmitting circuitry, for receiving the user-specific signal and the common signal and generating N narrow beams to be provided to the second antenna array;

first circuitry, coupled to the first transmitting circuitry, for ensuring that the user-specific signal and the common signal at the first antenna array elements are in-phase and time-aligned; and second circuitry, coupled to the second transmitting circuitry, for ensuring that the user-specific signal and the common signal at the second antenna array are in-phase and time-aligned.

11. The apparatus in claim 10, further comprising:

first receiving circuitry coupled to the first beam forming network;

second receiving circuitry coupled to the second beam forming network;

a signal processor, coupled to the first and second receiving circuitry, for processing signals received on the N beams from the first beam forming network and on the N beams from the second beam forming network to estimate a received signal.

12. The apparatus in claim 1, further comprising:

beam weighting circuitry for weighting the user-specific signal with a user-specific signal beam filter weight corresponding to each beam and providing each weighted user-specific signal to a corresponding beam filter.

13. The apparatus in claim 12, wherein the user-specific signal beam filter weights are configured so that radiated energy from the antenna elements is directed to a desired mobile user.

14. The apparatus in claim 12, wherein the beam weighting circuitry is configured to apply the user-specific beam filter weights to the user-specific signal so that the common signal received by a mobile receiver can be used by the mobile receiver to perform channel estimation without having to use the mobile user-specific signal to perform the channel estimation.

15. The apparatus in claim 12, wherein the beam weighting circuitry is configured to compensate the user-specific signal to control a phase relationship between the user-specific signal and the common signal.

16. An apparatus in a transmitter, comprising:

an antenna array including multiple antenna elements for transmitting a wider beam covering a majority of a sector cell that includes a common signal and at least one narrower beam covering only a part of the sector cell that includes a mobile user-specific signal;

transmitting circuitry coupled to the antenna array; and circuitry, coupled to the transmitting circuitry, for ensuring that the user-specific signal and the common signal are substantially time-aligned and have a controlled phase difference when received at mobile stations in the sector cell, wherein the circuitry is configured to compensate one or both of the common signal and the user-specific signal before transmission by the transmitter so that the common signal received by a mobile receiver can be used by the mobile receiver to perform channel estimation without having to use the mobile user-specific signal to perform the channel estimation.

17. The apparatus in claim 16, wherein the circuitry includes filtering circuitry configured so that the common signal is transmitted only from a center antenna element in the antenna array.

18. The apparatus in claim 16, wherein the circuitry is configured so that the wide beam carrying the common signal is generated using multiple antenna elements in the antenna array.

19. The apparatus in claim 16, wherein the circuitry includes filtering circuitry configured to compensate distortions in the common signal and the user-specific signal associated with conversion of the common signal and the user-specific signal from baseband frequency to radio frequency.

20. The apparatus in claim 16, further comprising:

beam weighting circuitry for weighting the user-specific signal with a user-specific signal beam filter weight corresponding to each antenna and providing each weighted user-specific signal to a corresponding antenna transmit filter.

21. The apparatus in claim 20, wherein the user-specific signal beam filter weights are configured so that radiated energy from the antenna elements is directed to a desired mobile user.

22. The apparatus in claim 20, further comprising:

beam weighting circuitry for weighting the common signal with a common signal beam filter weight corresponding to each antenna and providing each weighted common signal to a corresponding antenna transmit filter.

23. The apparatus in claim 22, wherein the common signal beam filter weights are configured so that radiated energy from the antenna elements is directed in a desired shape in the sector cell.

24. The apparatus in claim 22, wherein the user-specific signal and common signal beam weights are complex numbers used to phase-rotate and amplify the user-specific and common signals, respectively.

25. The apparatus in claim 22, wherein the beam weighting circuitry is configured to apply the user-specific beam filter weights to the user-specific signal or the common signal beam filter weight to the common signal so that the common signal received by a mobile receiver can be used by the mobile receiver to perform channel estimation without having to use the mobile user-specific signal to perform the channel estimation.

26. The apparatus in claim 22, wherein the beam weighting circuitry is configured to compensate the user-specific signal to control a phase relationship between the user-specific signal and the common signal.

27. The apparatus in claim 20, wherein the user-specific beam filter weights are selected to match an average spatial signature which is a complex valued measure of an average received signal as a function of an angle at which the received signal is received.

28. The apparatus in claim 20, wherein the user-specific beam weights are selected to minimize a transmitted power allocated to a mobile user such that a standard deviation of a phase difference between the common and user-specific signals received by the mobile user is less than or equal to a target value that ensures a desired quality of service.

29. The apparatus in claim 16, further comprising:

a beam forming network coupled to the N antenna elements for generating N received beams;

receiving circuitry coupled to the beam forming network;

a signal processor, coupled to the receiving circuitry, for processing signals received on the N received beams to estimate a received signal and for determining statistics of a channel through which the received signals propagate.

30. The apparatus in claim 16, further comprising:

first and second antenna arrays each including N antenna elements for transmitting a wider beam covering a majority of a sector cell that includes a common signal and at least one narrower beam covering only a part of the sector cell that includes a mobile user-specific signal;

first transmitting circuitry coupled to the first antenna array for providing the user-specific signal and the common signal to the first antenna array;

second transmitting circuitry coupled to the second antenna array for providing the user-specific signal and the common signal to the second antenna array;

first circuitry, coupled to the first transmitting circuitry, for ensuring that the user-specific signal and the common signal from the first antenna elements are substantially time-aligned and have a controlled phase difference when received at mobile stations in the sector cell; and second circuitry, coupled to the second transmitting circuitry, for ensuring that the user-specific signal and the common signal from the second antenna elements are substantially time-aligned and have a controlled phase difference when received at mobile stations in the sector cell.

31. The apparatus in claim 30, further comprising:

a first beam forming network coupled to the antenna array;

first receiving circuitry coupled to the first beam forming network;

a second beam forming network coupled to the antenna array;

second receiving circuitry coupled to the second beam forming network;

a signal processor, coupled to the first and second receiving circuitry, for processing signals received on the N beams from the first beam forming network and on the N beams from the second beam forming network to estimate a received signal.

32. A method implemented in a radio transmitter node including an antenna array including multiple antenna elements, comprising:

filtering a user-specific signal and a common signal to ensure that the user-specific signal and the common signal are substantially in-phase and substantially time-aligned at the antenna array, and transmitting simultaneously from the antenna array a wider beam covering a majority of a sector cell that includes the common signal and at least one narrower beam covering only a part of the sector cell that includes the user-specific signal, wherein the filtering compensates the user-specific signal so that the common signal received by a mobile receiver can be used by the mobile receiver to perform channel estimation without having to use the mobile user-specific signal to perform the channel estimation.

33. The method in claim 32, further comprising:

transmitting the common signal only from a center antenna element in the antenna array.

34. The method in claim 33, wherein the processing includes compensating distortions in the common signal and the user-specific signal associated with conversion of the common signal and user-specific signals from baseband frequency to radio frequency.

35. The method claim 33, wherein the processing includes weighting the user-specific signal to ensure that the user-specific signal are substantially in-phase and substantially time-aligned with the common signal at a center element of the antenna array.

36. The method in claim 33, wherein the antenna array includes an odd number N of antenna elements, where N is a positive integer greater than 1, and wherein a beam forming network in the radio base station receives the user-specific signal and the common signal and generates N narrow beams to be provided to the antenna array.

37. The method in claim 36, further comprising:

transmitting the user-specific signal simultaneously on the N beams with a power that is determined using N user-specific beam weights, each user-specific beam weight corresponding to one of the N beams, such that a beam narrower than a beam radiating the common signal is radiated in a direction of the user.

38. The method in claim 37, wherein each user-specific beam weight is proportional to a function of an uplink average signal power received on the corresponding beam.

39. The method in claim 37, further comprising:

processing signals received on the N beams to estimate a received signal, and determining an average uplink signal power for each beam.

40. The method in claim 37 implemented in two transmit diversity branches.

41. The method in claim 37 implemented in two receive diversity branches, further comprising:

processing signals received on the N beams from the two receive diversity branches to estimate a received signal.

42. The method in claim 32, further comprising:

applying user-specific beam filter weights to the user-specific signal so that the common signal received by a mobile receiver can be used by the mobile receiver to perform channel estimation without having to use the mobile user-specific signal to perform the channel estimation.

43. The method in claim 32, further comprising:

compensating the user-specific signal to control a phase relationship between the user-specific signal and the common signal.

44. A method implemented in a radio transmitter node including an antenna array including multiple antenna elements, comprising:

before transmission by the radio transmitter node, processing a user-specific signal and a common signal to ensure that the user-specific signal and the common signal are substantially time-aligned and have a controlled phase difference when received at mobile stations in the sector cell, before transmission by the radio transmitter node, applying user-specific beam filter weights to the user-specific signal or common signal beam filter weights to the common signal so that the common signal received by a mobile receiver can be used by the mobile receiver to perform channel estimation without having to use the mobile user-specific signal to perform the channel estimation, and transmitting simultaneously from the antenna array a wider beam covering a majority of a sector cell that includes the common signal and at least one narrower beam covering only a part of the sector cell that includes the user-specific signal.

45. The method in claim 44, further comprising:

transmitting the common signal from only one of the N antenna elements.

46. The method in claim 44, wherein the user-specific signal is transmitted simultaneously from the N antenna elements.

47. The method in claim 46, wherein the user-specific signal is transmitted with a power and a phase rotation that are determined using N user-specific antenna weights.

48. The method in claim 47, wherein the user-specific signal antenna weights are configured so that radiated energy from the antenna elements is directed to a desired mobile user in the sector cell.

49. The method in claim 47, wherein the common signal is transmitted with a power and a phase rotation that are determined using N antenna weights.

50. The method in claim 49, wherein the common signal beam weights are configured so that radiated energy from the antenna elements is directed in a desired shape in the sector cell.

51. The method in claim 50, wherein the user specific and common signals are transmitted simultaneously from the N antenna elements with a power that is determined using N user-specific and N common signal beam weights, respectively, each user-specific beam weight and each common signal beam weight corresponding to one of the N antenna elements, further comprising:

selecting the user-specific beam weights to direct radiated energy from the antenna array to a desired mobile user, and selecting the common signal beam weights to direct radiated energy from the antenna array in a desired shape.

52. The method in claim 49, wherein the user-specific and common signal beam weights are complex numbers used to phase-rotate and amplify the user-specific and common signals, respectively.

53. The method in claim 47, further comprising:

selecting the user-specific weights to match an average spatial signature which is a complex valued measure of an average received signal as a function of an angle at which the received signal is received.

54. The method in claim 37, further comprising:

selecting the user-specific beam weights to minimize a transmitted power allocated to a mobile user such that a standard deviation of a phase difference between the common and user-specific signals received by the mobile user is less than or equal to a target value that ensures a desired quality of service.

55. The method in claim 44, wherein the processing includes compensating distortions in the common signal and user-specific signal associated with conversion of the common signal and user-specific signals from baseband frequency to radio frequency.

56. The method in claim 44 implemented in two transmit diversity branches.

57. The method in claim 44, further comprising:

compensating one or both of the common signal and the user-specific signal so that the common signal received by a mobile receiver can be used by the mobile receiver to perform channel estimation without having to use the mobile user-specific signal to perform the channel estimation.

58. The method in claim 44, further comprising:

compensating the user-specific signal to control a phase relationship between the user-specific signal and the common signal.

* * * * *

UNITED STATES PATENT AND TRADEMARK OFFICE

CERTIFICATE OF CORRECTION

PATENT NO. : 7,664,533 B2
APPLICATION NO. : 10/704158
DATED : February 16, 2010
INVENTOR(S) : Logothetis et al.

It is certified that error appears in the above-identified patent and that said Letters Patent is hereby corrected as shown below:

In Fig. 10, Sheet 12 of 13, delete “ 

” and insert -- 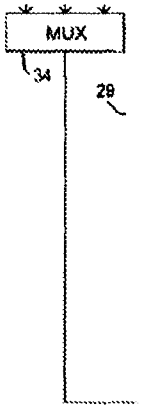

--, therefor.

In Column 9, Line 27, delete “A1-A3” and insert -- $A_1$-$A_3$ --, therefor.

In Column 13, Line 5, in Equation (12), delete “
$$\mu(w) = \frac{E\{r_c r_d^H\}}{\sqrt{E\{|r_c|^2\} + \sigma_{cc}^2}\sqrt{E\{|r_d|^2\} + \sigma_d^2}}$$
” and insert --
$$\mu(w) = \frac{E\{r_c r_d^H\}}{\sqrt{E\{|r_c|^2\} + \sigma_c^2}\sqrt{E\{|r_d|^2\} + \sigma_d^2}}$$
--, therefor.

In Column 18, Line 11, in Claim 35, delete “method” and insert -- method in --, therefor.

In Column 20, Line 12, in Claim 54, delete “37,” and insert -- 47, --, therefor.

Signed and Sealed this

Twenty-second Day of June, 2010

David J. Kappos

David J. Kappos
*Director of the United States Patent and Trademark Office*